United States Patent [19]

Terbrack et al.

[11] 4,412,355

[45] Oct. 25, 1983

[54] PUSH-BUTTON OPERATED ELECTRICAL POWER SOURCE FOR AN OPTICAL COMMUNICATION LINK

[75] Inventors: William H. Terbrack, Irvine; Terry L. Hummel, Laguna Hills, both of Calif.

[73] Assignee: Hughes Aircraft Company, El Segundo, Calif.

[21] Appl. No.: 311,367

[22] Filed: Oct. 14, 1981

[51] Int. Cl.$^3$ .............................................. H04B 9/00
[52] U.S. Cl. ................................. 455/603; 455/617; 455/127; 322/1; 310/25
[58] Field of Search ...................... 322/1, 2 A; 320/2; 455/603, 618, 617, 127, 308; 310/25; 354/135

[56] References Cited

U.S. PATENT DOCUMENTS 3,480,808 11/1969 Rieth ...................................... 310/25

*Primary Examiner*—John C. Martin
*Assistant Examiner*—Edward L. Coles

*Attorney, Agent, or Firm*—Lewis B. Sternfels; W. J. Bethurum; A. W. Karambelas

[57] ABSTRACT

In the present invention, a novel magnetic circuit maximizes the electrical power generated upon manual actuation of a push-button switch while minimizing the required weight of the magnetic materials. In particular, the magnetic circuit of the power supply of the present invention includes the following magnetic materials: an unmagnetized core (comprising iron) around which a coil is wound, the coil being connected to supply power to the transmitter; a permanent magnet (comprising iron having a permanent magnetic moment) mounted on a vibrating reed, at least one pole of the permanent magnet facing at least one end of the core. Actuation of the push-button switch induces oscillatory motion of the reed and of the permanent magnet. An advantage of this novel magnetic circuit is that, in at least one embodiment, the oscillatory motion of the permanent magnet causes a complete flux reversal through the coil during each cycle of the mechanical oscillation of the reed, a significant advantage.

7 Claims, 7 Drawing Figures

PUSH-BUTTON OPERATED ELECTRICAL POWER SOURCE FOR AN OPTICAL COMMUNICATION LINK

RELATED APPLICATIONS

The application is related to U.S. patent application Ser. No. 311,366 filed herewith by George Cernik, entitled "Push Button Switch for an Electrical Power Source", and assigned to the assignee of the present application.

TECHNICAL FIELD

This invention is related to infrared pulse-coded optical communication links.

BACKGROUND ART

Commercial passenger airplanes are typically designed to provide the maximum comfort and convenience for passengers by providing such features as overhead fans, lights, stewardess call buttons, stereo headphones and movies. The size and weight of such features is necessarily limited in order that the airplane may carry the maximum number of passengers with as much passenger space as possible. Accordingly, because each passenger must exercise control over his own overhead fan, light and stewardess call button, most of the control hardware and cabling is provided in the overhead ceiling above the passengers, since this represents the simplest arrangement for all of the control lines and control hardware.

It would be desirable to provide for passenger control of all the foregoing items in the armrest of each passenger chair on an individual basis. It might be possible to simply install a number of switches in the arm of the passenger chair and connect them through wires or cabling to the hardware and wiring already existing in the overhead ceiling. However, this would not be suitable because the installation of electrical wiring between the passenger seat and the ceiling makes such a device impractical and expensive to retrofit on existing airliners.

SUMMARY OF THE INVENTION

In the present invention, these problems are overcome by the installation of a miniaturized infrared wireless communication link between each passenger seat and the electronics in the overhead ceiling. A miniaturized infrared remote control transmitter is installed in the arm of the passengers seat. One significant problem solved by the present invention is that the infrared transmitter requires electrical power. This would ordinarily require that some electrical connection be made between the electrical power system of the airliner and the transmitter in the passengers seat arm, an undesirable feature. This problem is overcome in the present invention by using a mechanical switch actuated by the passenger to initiate oscillatory motion in a magnetic circuit contained in the transmitter, the magnetic circuit furnishing electrical power to the transmitter. Whenever the passenger desires to turn his overhead fan on, turn his electric light on, or call the stewardess, he simply selects a particular code to be transmitted on the transmitter by operating a select switch (or an equivalent device) and then actuates a push-button mechanical switch connected to the magnetic circuit. Electrical power is applied to the transmitter upon mechanical actuation of the push-button switch so that the transmitter transmits the selected code, in the form of a pulsed infrared signal, to a receiver. Preferably, the receiver is located in the overhead ceiling in the signal path of the transmitter and is connected to control the overhead fan, the overhead light, the stewardess call communications, and any other feature desired. The receiver decodes the transmitted signal code defining exactly what the receiver is supposed to command (for example, dimming of the overhead electrical light). Remote control infrared pulse-coded communication links are well-known in the art and are disclosed, for example, in U.S. Pat. No. 4,264,982 to Sakarya and U.S. Pat. No. 4,241,456 to Nakagaki.

One problem with remote power supplies such as manually actuated magnetic circuits is that the electrical power supplied by such a circuit is limited by the size of the magnetic materials used in the circuit. In the present invention, a novel magnetic circuit maximizes the electrical power generated upon manual actuation of the push-button switch while minimizing the required weight of the magnetic materials. In particular, the magnetic circuit of the power supply of the present invention includes the following magnetic materials: an unmagnetized core (comprising iron) around which a coil is wrapped, the coil being connected to supply power to the transmitter; a permanent magnet (comprising iron having a permanent magnetic moment) mounted on a vibrating reed, at least one pole of the permanent magnet facing at least one end of the core. Actuation of the push-button switch induces oscillatory motion of the reed and of the permanent magnet. The advantage of this novel magnetic circuit is that, in at least one embodiment, the oscillatory motion of the permanent magnet causes a complete flux reversal through the coil during each cycle of the mechanical oscillation of the reed, a significant advantage.

This represents a significant improvement over prior art magnetic circuit power supplies including those wherein the coil is wrapped about a core having a *permanently* induced magnetic moment. In such prior art devices, if the permanently induced magnetic field in the core is great enough, it is not possible to completely reverse the flux through the coil by simply vibrating the reed. Accordingly, the vibrating motion of the reed in the present invention causes a greater magnetic flux change through the coil than prior art devices and therefore generates more electrical power with less magnetic material. This latter feature is especially useful in the remote control infrared transmitter of the present invention because of the requirement that it be miniaturized and be of extremely light weight.

In summary, the invention is a light weight remote control optical communicator which may be installed in the arm of a passenger chair in an airliner without requiring any wiring to be connected to the passenger chair arm. Furthermore, in the preferred embodiment of the invention, the communicator installed in the passenger chair arm has the same external container configuration as do those controls already installed in the passenger chair arm of most modern day airliners, so that the passenger chair arm need not be altered in any way in order to accommodate the optical communicator of the present invention. Accordingly, it is contemplated that all airliners may be retrofitted with the optical communicator of the present invention without great expense.

DESCRIPTION OF THE DRAWINGS

The invention is best understood by reference to the accompanying drawings, of which:

FIG. 1b is a perspective view of the push-button communicator of FIG. 1a;

FIG. 2b illustrates the preferred embodiment of the magnetic circuit of FIG. 2a;

DETAILED DESCRIPTION

Figure 1A:
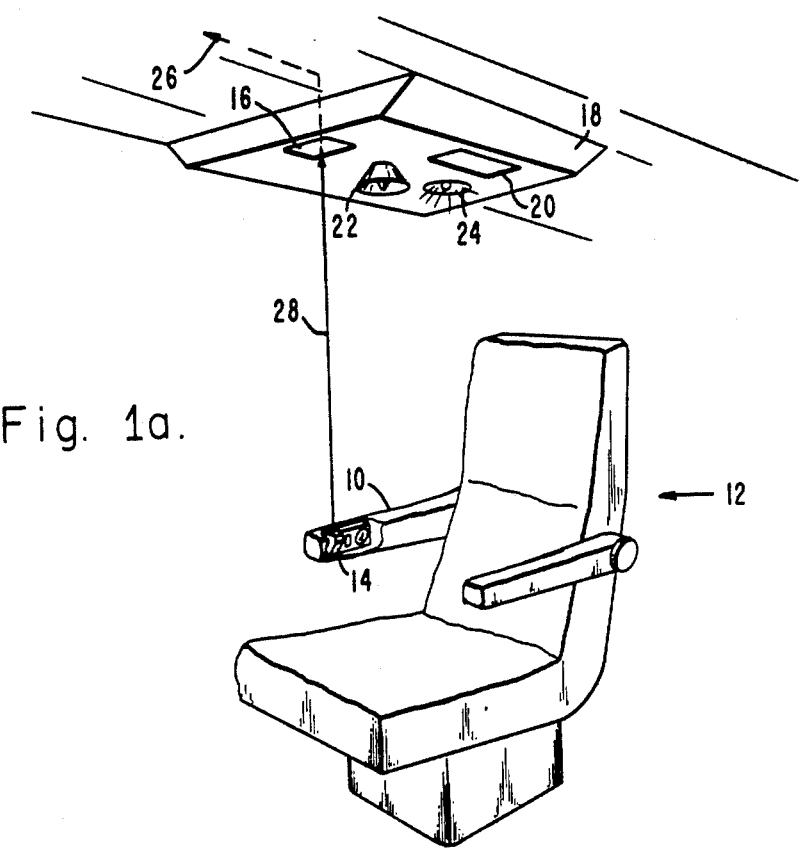
FIG. 1a is a simplified perspective view of the infrared communication link of the present invention installed in the arm of an airline passenger seat.
Figure 1B:
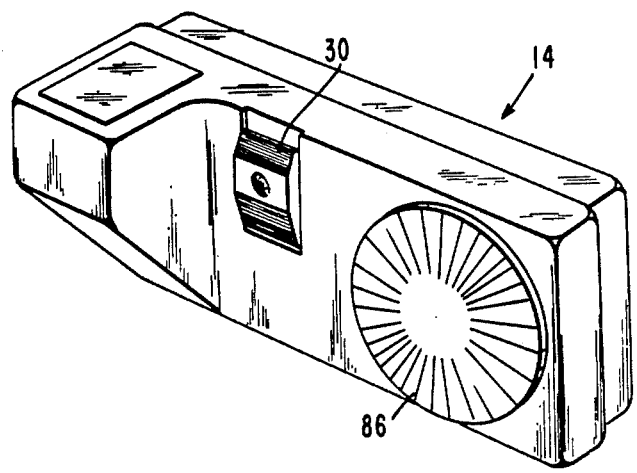

Referring to FIGS. 1a and b, the optical communication link of the present invention is installed in the arm 10 of a passenger chair 12 on a passenger airplane or airliner. The optical link includes a push-button actuated communicator 14 which is aligned with an optical receiver 16 located in the ceiling 18 over the chair 12. The receiver 16 communicates with control hardware 20 controlling, for example, an overhead fan 22 and an overhead electric light 24. The receiver 16 may also communicate via a link 26 with a stewardess call display (not shown) located in another part of the airliner.

The communicator 14 transmits a pulse-coded signal comprising an infrared beam 28 to the receiver 16, the communicator and receiver being of the types disclosed in the above-referenced Sakarya and Nakagaki patents, respectively.

It is contemplated that the push-button communicator 14 replaces a standard device previously installed in the passenger chair arm 10 of many modern airliners without any alteration to the arm 10 being required.

Figure 2A:
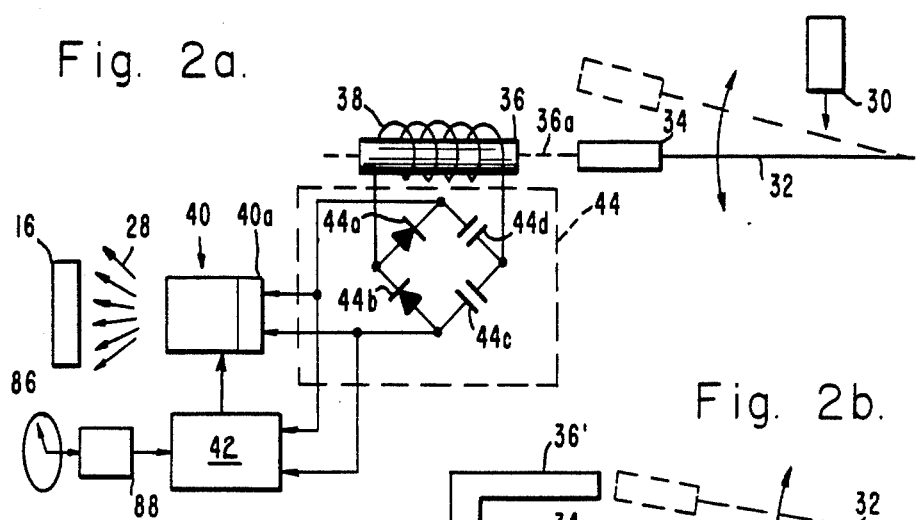
FIG. 2a is a simplified schematic diagram illustrating the magnetic circuit power supply of the present invention.

In the present invention, manual initiation of the coded signal beam 28 by the passenger and generation of electrical power in the communicator 14 is accomplished simultaneously by the use of a magnetic circuit illustrated in FIG. 2a. In the present invention, a manually actuated switch 30 induces oscillatory motion in a resilient reed 32 attached to a permanent magnet 34. The permanent magnet 34 moves back and forth in front of an unmagnetized core 36 around which a coil 38 is wrapped. The motion of the permanent magnet 34 is such that it moves into and out of alignment with axis 36a of the core 36. The permanent magnet 34 therefore induces a change in magnetic flux through the coil 38 during each cycle of its oscillatory motion from approximately zero flux, when the permanent magnet is located in the dashed line position of FIG. 2a, to a maximum flux, when the permanent magnet is located in the solid line position. The coil supplies alternating current electrical power through a rectifier circuit 44 to an infrared transmitter 40 and a pulse code generator 42 controlling the transmitter 40, the transmitter 40 and generator 42 being included within the communicator 14. The rectifier circuit 44 rectifies the alternating current from the coil 38 to a direct current (D.C.) voltage. The rectifier circuit 44 is of the usual type and may include, for example, diodes 44a, 44b and capacitors 44c, 44d. The transmitter 40 generates a pulse-coded infrared signal 28 which is received and decoded in the receiver 16.

Figure 2B:
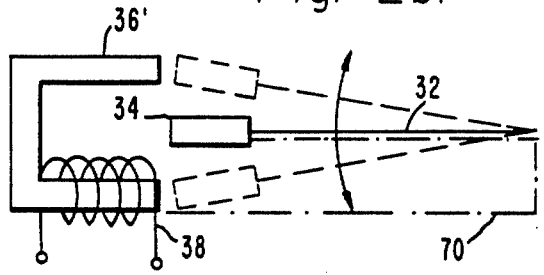

FIG. 2b illustrates the preferred embodiment of the invention in which complete magnetic flux reversal through the coil 38 is achieved during each cycle of oscillatory motion of the reed 32. In the preferred embodiment of FIG. 2b, the core 36' has a U-shape, one leg of the U having the coil 38 wrapped around it. The permanent magnet 34 vibrates between the two dashed line positions of FIG. 2b so that the direction of the magnetic field through the core 36' is actually reversed each time the permanent magnet moves from one dashed line position to the other dashed line position. Accordingly, the electrical power generated in the coil 38 is maximized.

Figure 2C:
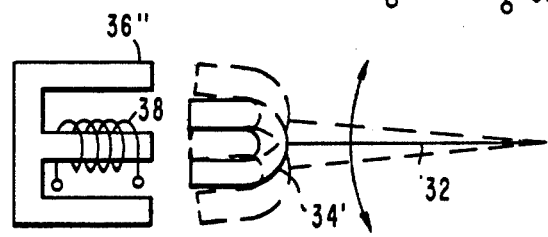
FIG. 2c illustrates an alternative embodiment of the magnetic circuit.

FIG. 2c illustrates an alternative embodiment of the invention comprising a U-shaped permanent magnet 34' having two legs and a double-U-shaped core 36" having three legs, the U-shaped magnet 34' alternating between the two dashed line positions illustrated in FIG. 2c in which each leg of the U-shaped permanent magnet 34' faces a different pair of the three legs of the core 36". Again, complete flux reversal through the coil 38 is achieved during each cycle of motion, a significant advantage. This configuration maximizes magnetic flux change through the core 36" for a given size magnet, and may require additional core material in some applications.

It should be apparent to a skilled worker that the current generated in the coil 38 is an alternating current which is rectified by the rectifier bridge circuit 44 to the desired voltage. Furthermore, it is contemplated that an electronic circuit 40a (illustrated in FIG. 2a) may be provided which initially disables the operation of the transmitter 40 until the capacitors 44c, 44d have been charged to the desired voltage. Of course, only a fraction of a second is required for the code generator 42 and transmitter 40 to generate the coded infrared signal beam 28, so that oscillatory motion of the reed 32 is required for only a fraction of a second.

In a second alternative embodiment of the power supply of FIG. 2b, a magnetic return path 70 (comprising an iron material) may be connected between the permanent magnet 34' and the unmagnetized core 36'.

Figure 3A:
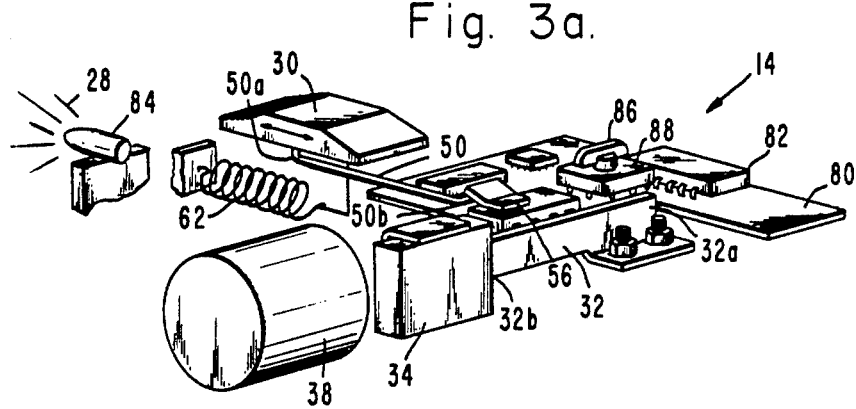
FIGS. 3a and 3b are exploded views of the push-button optical communicator of FIG. 1b, including the push-button switch which is the subject of the copending Cernik application referenced above.

The communicator 14 is illustrated in perspective in FIG. 3a and includes an integrated circuit chassis 80 having a plurality of integrated circuits 82, various ones of the integrated circuits 82 comprising the infrared transmitter 40 and the pulsed-coded generator 42. An infrared light emitting diode 84 is mounted on the chassis 80 and is controlled by the infrared transmitter 40. A rotating switch 86 controls a code selector 88 connected to certain ones of the integrated circuits 82 which comprise the code generator 42. The passenger dials a code which corresponds to the desired function by rotating the switch 86, and then manually actuates the slide switch 30 to transmit the code from the transmitter 40 to the receiver 16.

IMPROVED PUSH-BUTTON SWITCH

Figure 3B:
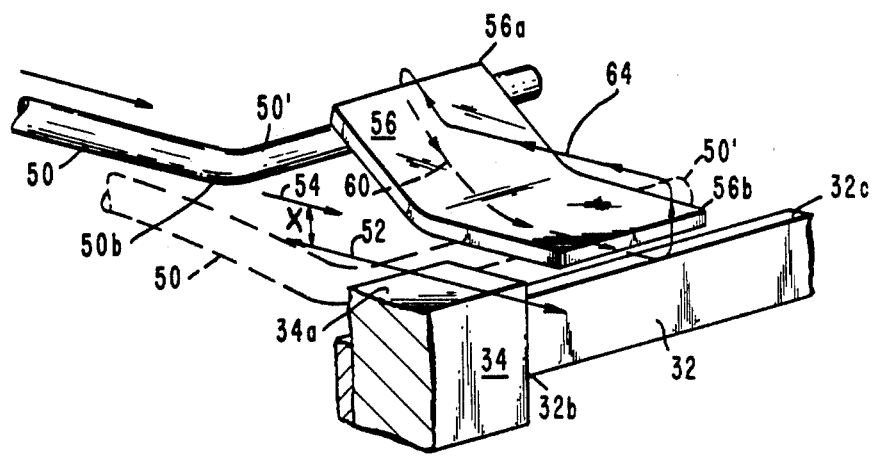

An improved push-button slide switch which is the subject of the above-referenced Cernik application is illustrated in the perspective views of FIGS. 3a and b. A more complete description is given in the Cernik application. The slide switch 30 actuated by the passenger is attached to an arm 50 which is located near the reed 32. The reed 32 is anchored at one of its ends 32a and secured to the permanent magnet 34 at the other of its ends 32b. Accordingly, the reed 32 may oscillate about an axis passing through its end 32a along an oscillation path 52. The slide switch 30 forces the arm 50 to move in a second path 54 parallel to the reed oscillation path 52 but displaced by a distance X above the oscillation path 52. The arm 50 is attached to the slide switch 30 at one of its ends 50a, the opposite arm end 50b being resiliently displaceable in a direction parallel to the displacement X between the two paths 52, 54. A curved ramp 56 having two ends is located adjacent the arm 50 and the permanent magnet 34. A finger 50' is attached to the arm end 50b and extends transversely with respect to the arm 50 towards the ramp 56. One end 56a of the ramp engages the finger 50', the other end 56b of the ramp 56 being located slightly below the oscillation path 52. Accordingly, when the slide switch 30 moves the arm 50 along the path 54, the finger 50' is forced downwardly across the bottom face of the ramp 56 along a route 60, forcing the arm end 50b to be resiliently displaced into the oscillation path 52 so that the arm end 50b engages the permanent magnet 54. As the slide switch 30 is moved further along the route 60, the magnet 34 and reed 32 are resiliently displaced along the oscillation path 52. When the finger 50' reaches the ramp end 56b, the finger 50' is suddenly released, so that it resiliently snaps upwardly out of the oscillation path 52 and into the orignial path 54. A spring 62 forces the slide switch 30 to be returned to its original position so that the arm 50 and finger 50' are returned to their equilibrium position illustrated in FIG. 3 along a return route 64.

As soon as the finger 50' has snapped back to the original path 54, the finger end 50b no longer engages the permanent magnet 34 so that the arm 50 and finger 50' are immediately taken out of the path of oscillation 52 and therefore do not interfere with the oscillating motion of the permanent magnet 34 thereafter. One advantage of the snapping motion of the finger 50' at the ramp end 56b is that it provides tactile feedback to the passenger at the slide switch 30 so the passenger knows that communication has been effected.

What is claimed is:
1. A power supply, comprising:
   an unmagnetized core;
   a coil associated with said core and having two output terminals;
   a permanent magnet;
   means for oscillating said permanent magnet near said coils so as to induce a magnetic flux in said core, said core being otherwise unmagnetized;
   means for permitting manual actuation of said oscillating means;
   a transmitter;
   a code generator associated with said transmitter;
   means coupling electrical power from said coil to said transmitter and said code generator, whereby said transmitter transmits a code in synchronism with said code generator upon manual actuation of said oscillating means;
   wherein said core comprises at least three legs and said permanent magnet comprises at least two legs, said coil being wound around at least one of said core legs, and said oscillating means cause said two magnet legs to face respective ones of alternate pairs of adjacent ones of said three core legs in alternate succession, whereby magnetic flux reversal through said core occurs in each motion cycle of said oscillating means.
2. The power supply of claim 1 further comprising manually actuated means controlling said core generator for selecting a particular code to be transmitted.
3. The power supply of claim 2 wherein said transmitter comprises an infrared optical link.
4. The communication link of claim 1 wherein said transmitter comprises an infrared optical transmitter.
5. The communication link of claim 1 further comprising a receiver associated with said transmitter for receiving said code.
6. The communication link of claim 1 further comprising manually actuated means for selecting a particular code to be transmitted, said selecting means operable prior to the manual powering of said generator for determining the code to be transmitted by said transmitter.
7. A power supply, comprising:
   an unmagnetized core;
   a coil associated with said core and having two output terminals;
   a permanent magnet;
   means for oscillating said permanent magnet near said coils so as to induce a magnetic flux in said core, said core being otherwise unmagnetized;
   wherein said core comprises at least three legs and said permanent magnet comprises at least two legs, said coil being wound around at least one of said core legs, and wherein said oscillating means cause said two magnet legs to face respective ones of alternate pairs of adjacent ones of said three core legs in alternate sucession, whereby magnetic flux reversal through said core occurs in each motion cycle of said oscillating means.

* * * * *